US005727347A

United States Patent [19]
Sellers

[11] Patent Number: 5,727,347
[45] Date of Patent: Mar. 17, 1998

[54] HANGING PLANT POT AND SAUCER SUPPORT APPARATUS

[76] Inventor: Kathleen R. Sellers, 228 Boca Raton Rd. East, Boca Raton, Fla. 33432

[21] Appl. No.: 693,971

[22] Filed: Aug. 8, 1996

[51] Int. Cl.⁶ .................. A01G 9/02; A47G 7/02
[52] U.S. Cl. .................................. 47/67; 47/71
[58] Field of Search ................ 47/67, 71, 65.5

[56] References Cited

U.S. PATENT DOCUMENTS

| 155,525 | 9/1874 | Landers | 47/67 |
|---|---|---|---|
| 2,057,972 | 10/1936 | Pieck | 47/71 |
| 2,605,588 | 8/1952 | Lindstaedt | 47/67 |
| 3,981,099 | 9/1976 | Dziewulski | 47/67 |
| 4,102,081 | 7/1978 | Morrow | 47/67 |
| 4,232,482 | 11/1980 | Watt et al. | 47/71 |
| 4,635,394 | 1/1987 | Brown | 47/67 |
| 4,912,875 | 4/1990 | Tardif | 47/67 |
| 5,052,149 | 10/1991 | Johnson | 47/67 |

*Primary Examiner*—Terry Lee Melius
*Assistant Examiner*—Joanne C. Downs
*Attorney, Agent, or Firm*—Malin, Haley, DiMaggio & Crosby

[57] ABSTRACT

A hanging plant pot support apparatus is provided which supports a standard or conventional plant pot and a moisture barrier from a single point at the plant pot's base. The apparatus includes a single rod member, a plant pot base support nut, and a moisture barrier such as a drip or catch saucer or dish. The apparatus can hang plant pots that already contain soil and have plants growing therefrom.

4 Claims, 7 Drawing Sheets

HANGING PLANT POT AND SAUCER SUPPORT APPARATUS

BACKGROUND OF THE INVENTION

1. Field of the Invention

This invention relates to a hanging plant pot support device which includes support of a saucer or dish commonly used under plant pots to catch water and residue from plant pots during and after watering of the plants therein.

2. Description of Related Art

Numerous hanging flower or plant pots are available. Some hanging pots include saucers, drip pans, or dishes positioned below the pot, and used to catch excess water and residue from the plants contained in the pot.

The majority of the hanging pots provided to date hang by suspension of the pot using various hanging mechanisms that generally attach the pot at or near the top edge, and where the saucer is then suspended or attached to the bottom of the pot.

Examples of related hanging pots as described herein above include the devices disclosed in: U.S. Pat. No. 3,943,661 to DeVito et al.; U.S. Pat. No. 3,981,099 to Dziewulski; U.S. Pat. No. 4,059,920 to Worrell; U.S. Pat. No. 2,695,588 to Lindstaedt; U.S. Pat. No. 1,648,570 to White; U.S. Pat. No. 155,525 to Landers; U.S. Pat. No. 3,990,179 to Johnson et al.; and U.S. Pat. No. 4,109,415 to Hall.

In each of these references, the associated pot is hung by suspension from a plurality of points, generally three, along the upper edge of the pot. The drip saucer in then positioned below, and attached to the suspended pot in a variety of manner as disclosed in the related references.

U.S. Pat. No. 2,120,599 to Brown and U.S. Pat. No. 1,391,353 to Wells disclose additional devices for attachment of a drip saucer to a nonhanging pot.

None of the related references cited herein above disclose a device to hang a standard or conventional pot by support at the base of the pot. Each pot used with the related references mentioned herein must have provisions at the upper edge of the pot to attach the suspending device.

Furthermore, none of the related references suspend a pot from a single point. The related references attach at multiple points along the upper edge of the pot using various mechanisms such as metal or plastic wire or chain. The multiple locations of attachment can interfere with watering and maintenance of the plant contained within the pot. The wire or chain can be easily seen when viewing plants contained within the pot thereby interfering with aesthetics.

In addition, no prior art hanging device is suitable for use in a plant that is already planted and growing in a pot.

SUMMARY OF THE INVENTION

The present invention is a plant pot suspension support that includes suspension of a water retaining barrier such as a pot drip saucer or water collecting dish. The present invention comprises a hanging, or support rod having at a least a portion thereof threaded; a plant pot support nut threadably engaged on the threaded rod to support a pot thereon; and a rigid water retaining barrier positioned below the plant pot support nut and removably attached by a suitable fastener. The water retaining barrier may be any suitable shape such as a saucer, and which is attached to the plant pot support nut by any suitable manner such as engagement with mating locking taps located on both the support nut and the saucer. Alternately, the saucer can be threaded and attached to mating threads located on the underside of the support nut. In a second alternate manner, the saucer can have a threaded central portion that mates with the threaded rod such that the saucer is threaded onto the rod just below the threaded support nut.

To install the invention, the threaded end of the support rod is first passed through the central aperture located in the plant pot to be hung. If the plant pot contains soil and a plant, the threaded end of the support rod is first gently fed down through the plant roots and soil and out through the central aperture located in the plant pot bottom. The ability to hang plants that are already planted and growing, without the need to replant, is an important feature of the present invention.

Next, the plant pot support nut is threaded onto the support rod to support the base of the pot. The drip saucer is next attached below the plant pot support nut in the manner of attachment of one of the embodiments mentioned herein. The entire assembly is hung from the single support rod.

The only requirement for a standard or conventional plant pot to be used with the present invention, is there must be an aperture located near the center of the bottom of the pot for the support rod to pass through. This requirement does not present a problem in use of the present invention as most standard plant pots already have a suitable central aperture. In the case of a planter without a center aperture, a central aperture can easily be made in most planters using a standard hand drill or utility knife.

The present invention supports standard pots, of varying size, by support at the pot base. The single threaded rod used to hang the pot and saucer is centrally located in the plant pot. There are no chains or wire extending to the outer edge of the pot to interfere with aesthetics, or get in the way of watering and plant maintenance.

Accordingly, it is an objective of the present invention to provide a hanging plant pot support apparatus that supports a plant pot from a single central point at the pot's base.

It is another objective of the present invention to provide a hanging plant pot support apparatus that is used in conjunction with standard or conventional plant pots, with or without existing soil and/or plants therein.

It is still a further objective of the present invention to provide a hanging plant pot support apparatus that attaches to a drip saucer or other water retaining barrier.

In accordance with these and other objects which will become apparent hereinafter, the instant invention will now be described with particular reference to the accompanying drawings.

DESCRIPTION OF THE PREFERRED EMBODIMENTS

Figure 1:
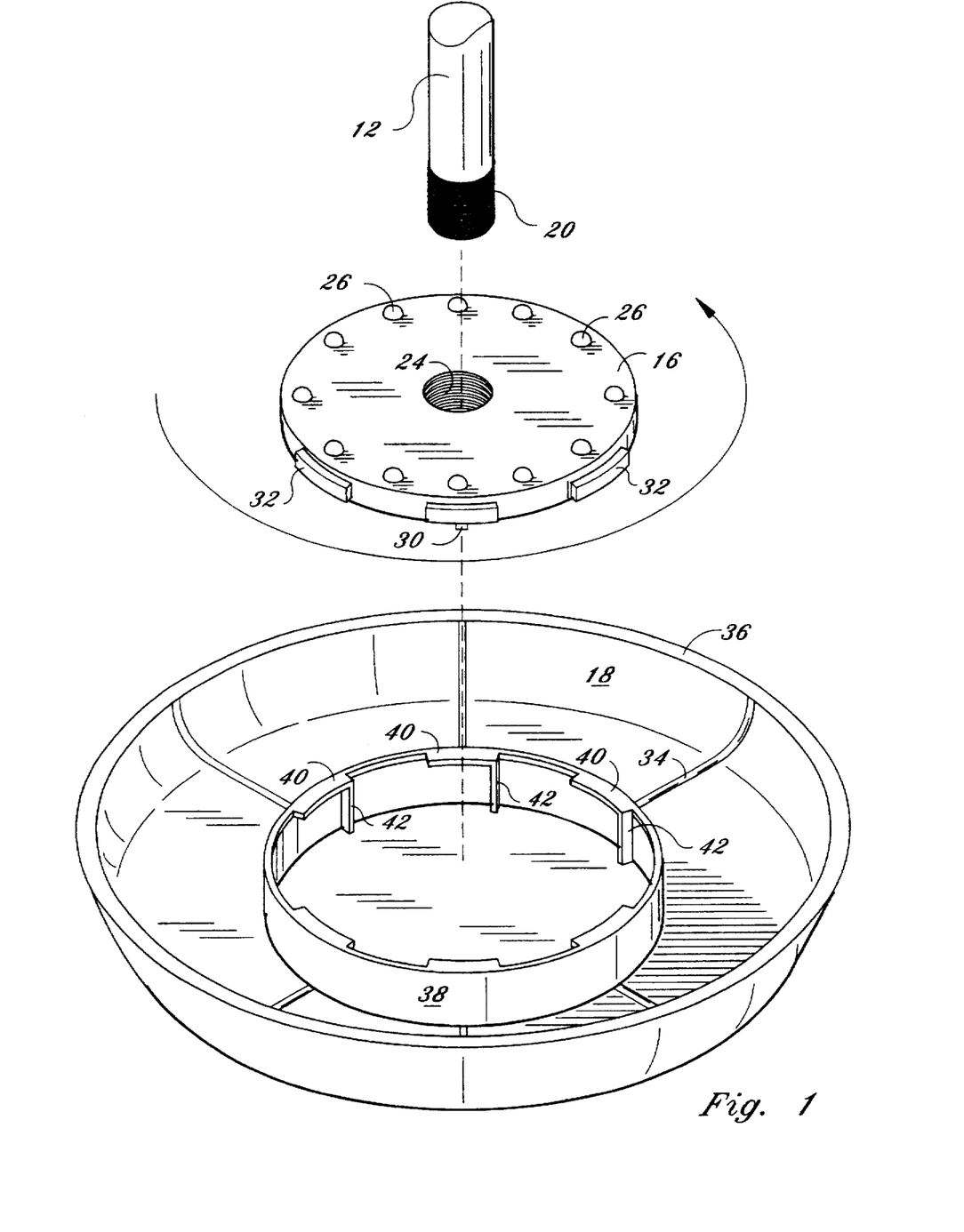
FIG. 1 is a partial exploded perspective view of the present invention.
Figure 7:
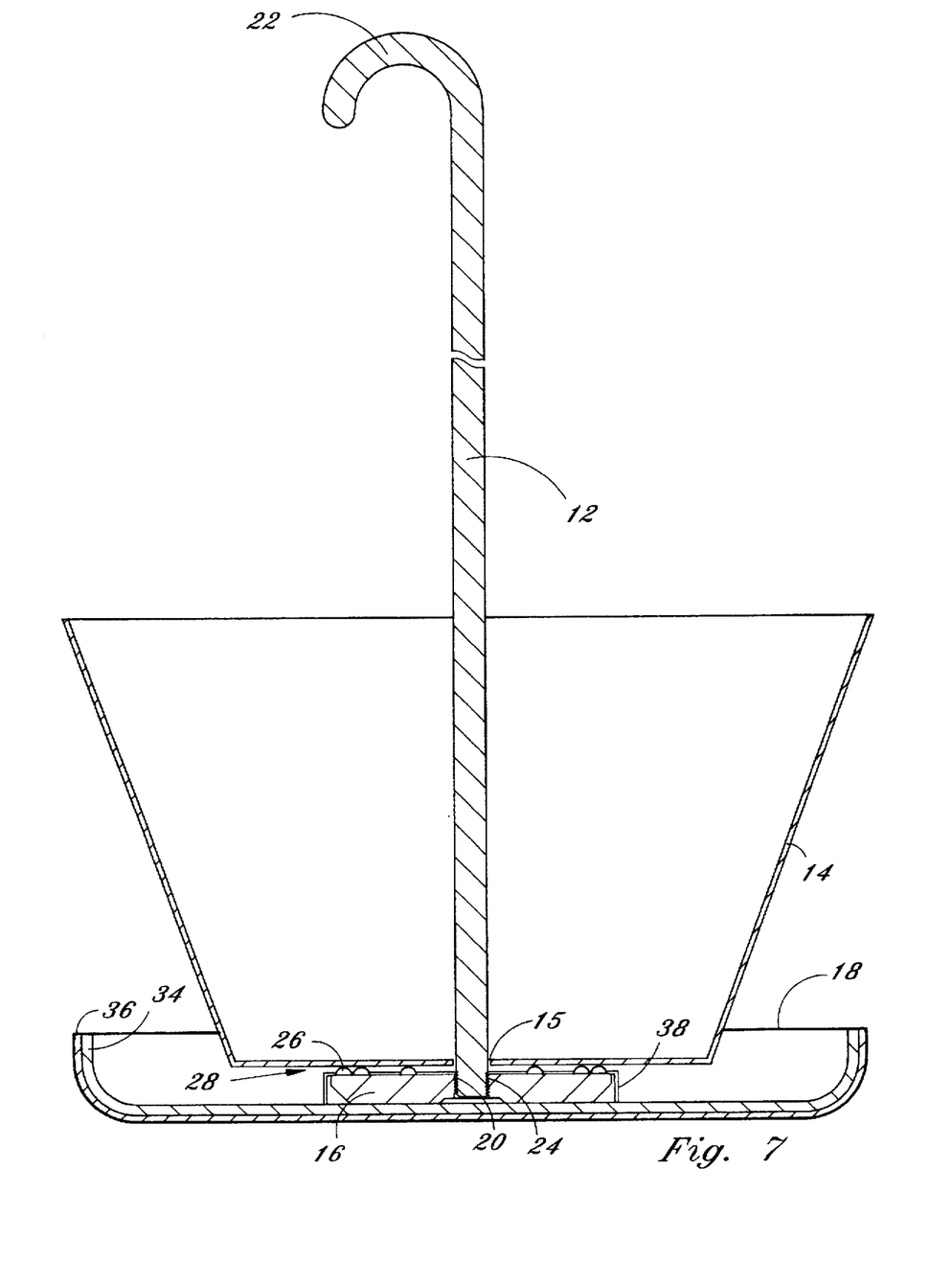
FIG. 7 is a side elevational view taken in cross-section of the present invention.

Referring now to FIG. 1, there is shown a partial exploded perspective view of the present invention. The device of the present invention includes hanging or support rod 12, plant pot support nut 16, and a water retaining barrier shown as example in the shape of a drip saucer or dish 18. Referring to FIG. 7, a cross-sectional view of the present invention is shown which includes standard or conventional plant pot 14.

Support rod 12 is at least partially threaded at 20, and has suitable means for hanging, such as hook 22. Support rod 12 is made of a suitable rigid material, such as metal or plastic, and can be solid or tubular. Support rod 12 is preferably a solid metal bar.

Plant pot 14 is a truncated conical container, open at one end, and having a centrally located drain aperture or passage at the opposite end 15. Whenever the plant and soil are periodically watered, excess moisture can drain or seep from the pot through aperture 15 located at or near the center of the bottom through which rod 12 passes, as seen in FIG. 7 and into the water retaining barrier which is described below.

Figure 2:
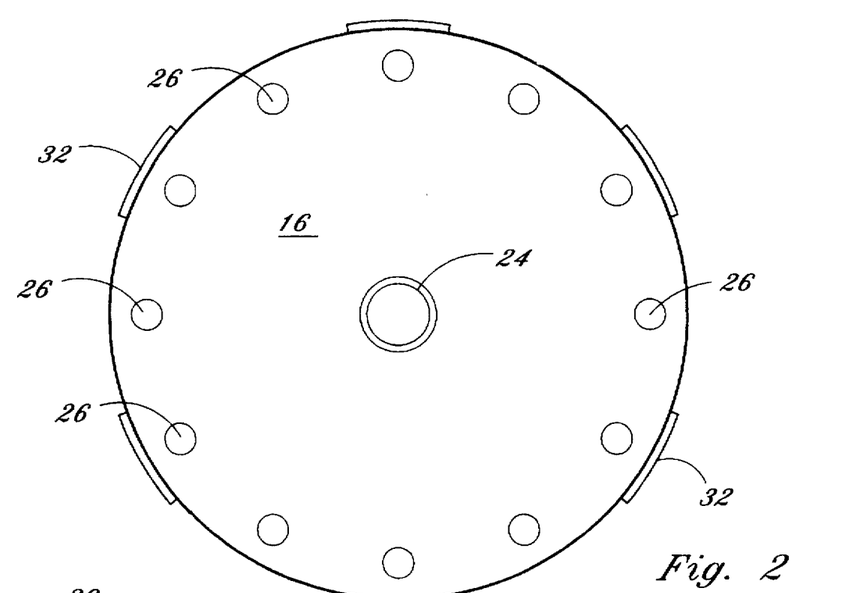
FIG. 2 is a top plan view of the plant pot support nut of the present invention.
Figure 3:
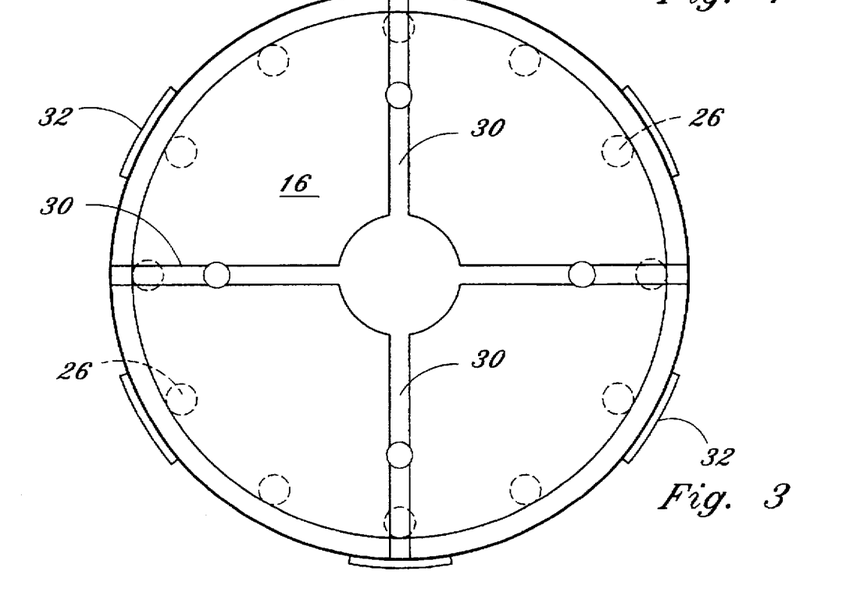
FIG. 3 is a bottom plan view of the plant pot support nut of the present invention.
Figure 4:
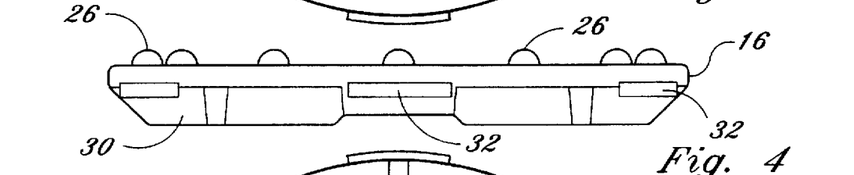
FIG. 4 is a side elevational view of the plant pot support nut of the present invention.

Plant support nut 16, as best seen in FIGS. 2–4, is threaded at 24 with threads that mate with rod 12 at threaded portion 20. Plant support nut 16 includes raised portions 26, which support and stabilize plant pot 14, as seen in FIG. 7. Raised portions 26 maintain clearance, or a spaced relationship 28, between the bottom of plant pot 14 and the upper surface of plant support nut 16 to permit drainage of moisture from pot 14. Alternately, the raised portions 26 could be replaced with suitably sized and positioned grooves in support nut 16 (not shown).

Plant support nut 16 provides rigid support to plant pot 14 and preferably has a plurality of reinforcing members 30 to provide rigidity without undue thickness. As shown in FIG. 3, there are 4 reinforcing members 30, which are also used to grasp when threading nut 16 onto rod 12. Four reinforcing members 30 are used for example only. The number of reinforcing members 30 selected to be used on the present invention may vary such as selecting 3 instead of 4.

Plant support nut 16 is made of a suitable material such as nylon or polypropylene. Plant support nut 16 also has a plurality of raised members or support shelve members 32 which are used, as will be shown in detail below, to attach drip saucer 18.

Figure 5:
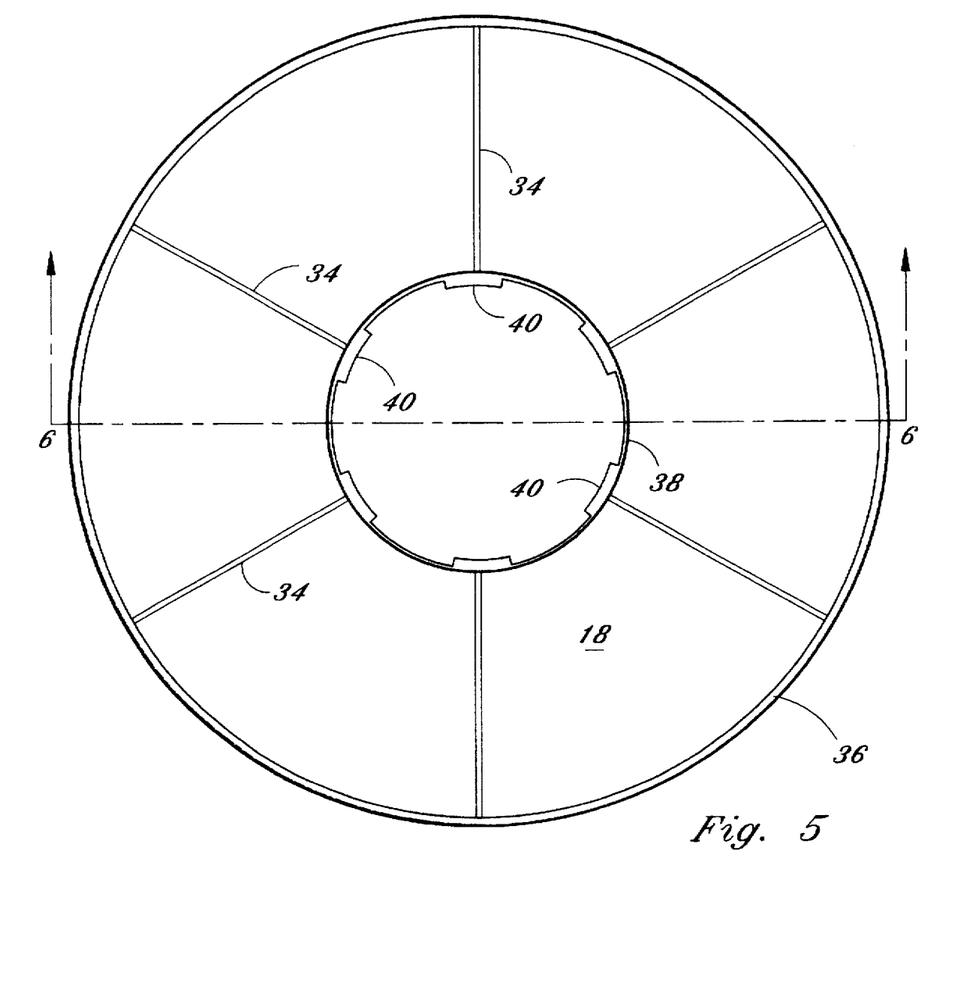
FIG. 5 is a top plan view of the drip saucer of the present invention.
Figure 6:
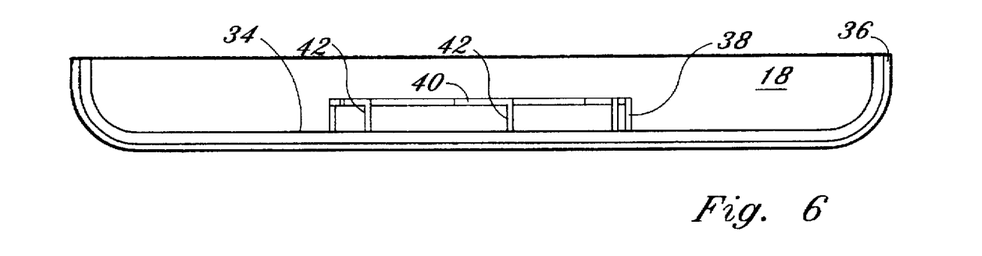
FIG. 6 is a cross-sectional view, taken along line 6—6 in FIG. 5, of the drip saucer of the present invention.

Referring now to FIGS. 5 and 6, drip saucer 18, which can be any shape, is used to catch water and other residue coming from plants which grow in plant pot 14. Plant pot 14 must have at least one centrally located aperture 15, and may have a plurality of apertures for drainage (not shown). Drip saucer 18 is made of any suitable water proof material such as plastic. Drip saucer 18 may be made with a plurality of rigid members 34 which maintain rigidity of saucer 18 without undue thickness Saucer 18 has an essentially cylindrical central portion 38 sized to receive plant support nut 16. Central portion 38 has a plurality of shelve portions 40 mounted on the interior wall thereof. Shelves 40 are equal in number to, and positioned in mating configuration with support shelves 32 located on plant support nut 16. Each shelve 40 has a stop portion 42 at one end, as best seen in FIG. 1.

As seen in FIGS. 1 and 7, rod 12 is first manually positioned longitudinally along the central conical axis of plant pot 14 through aperture 15. Threaded aperture 24 of plant support nut 16 is then threaded onto rod 12 at threaded portion 20. Central portion 38 of saucer 18 is then positioned over plant support nut 16. Central portion 38 and plant support nut being sized in diameter so that support shelves 32 of nut have clearance only to fit into the spaces between shelve portions 40. Once saucer 18 is fully positioned over plant support nut 16, saucer 18 is then rotated so support shelves 32 engage and slide under shelves 40. Saucer 18 can be thus rotated until support shelves 32 of plant support nut 16 are stopped by stop portions 42 of central portion 38 of saucer 18.

Figure 8:
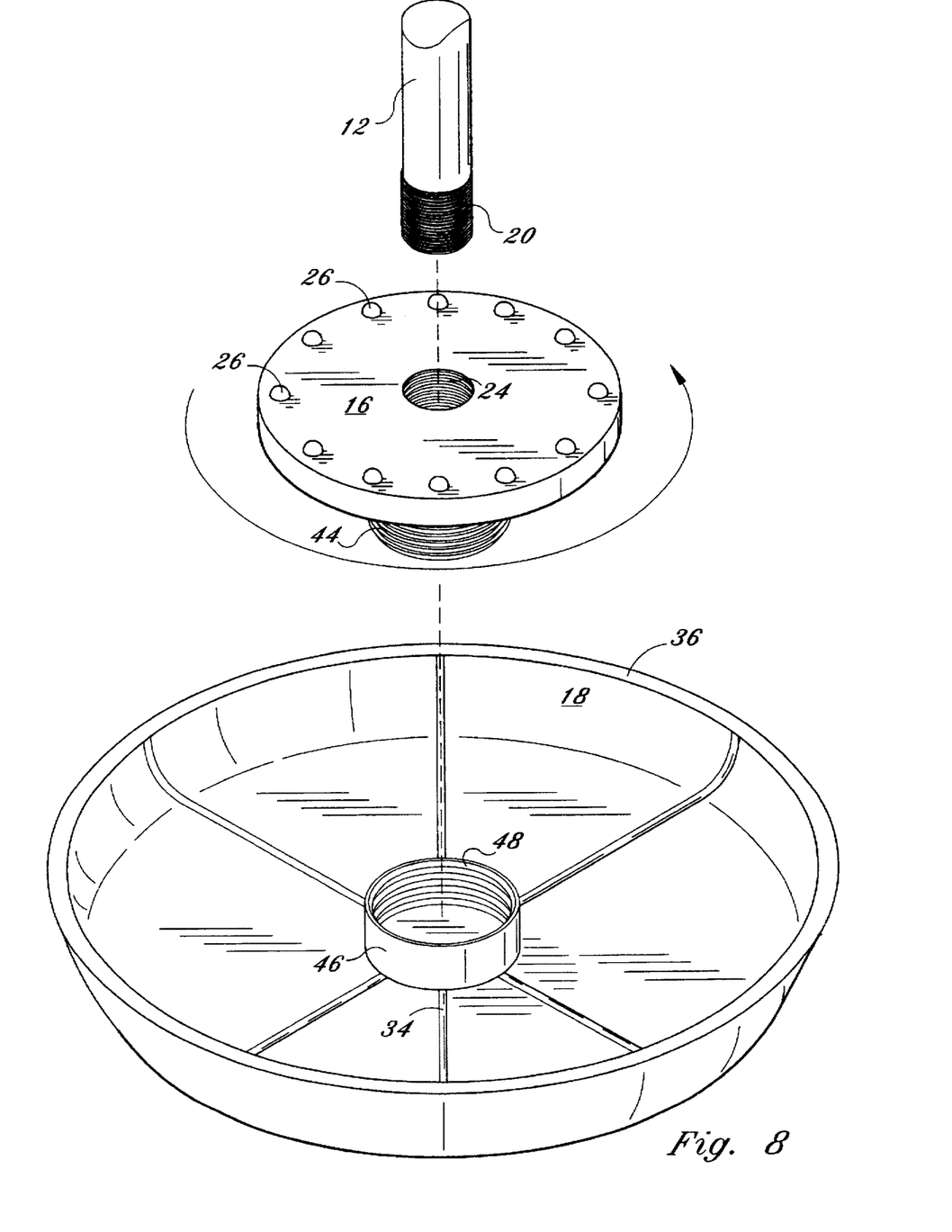
FIG. 8 is a partial exploded perspective view of an alternate embodiment of the present invention.

Referring now to FIG. 8, an alternate embodiment of the present invention is shown. The alternate embodiment of FIG. 8 is similar to the above preferred embodiment except plant support nut 16 has a threaded portion 44 instead of support shelves 32. Saucer 18 has a central portion 46 which has threaded area 48 that is sized to mate with threaded portion of nut 16. Assembly is similar to that described herein above, except saucer 18 is attached by threaded area 48 being threaded onto mating threaded portion 44 of nut 16.

Figure 9:
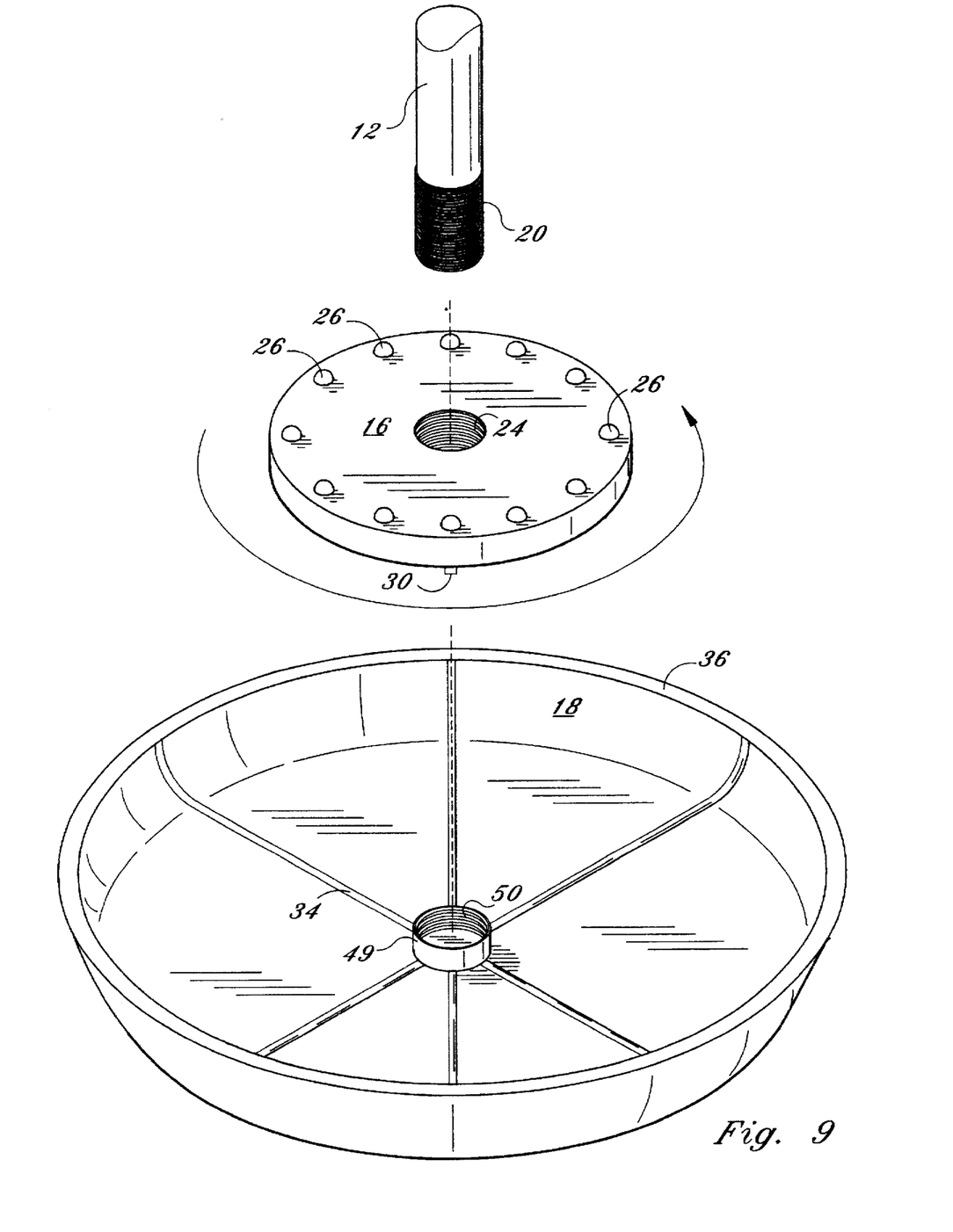
FIG. 9 is a partial exploded perspective view of an alternate embodiment of the present invention.

Referring now to FIG. 9, a second alternate embodiment of the present invention is shown. The second alternate embodiment is similar to the embodiments herein above described except saucer 18 has a central portion 49 that has threaded portion 50, which contains threads sized to mate with threaded portion 20 of rod 12. In this embodiment, threaded portion 24 must pass completely through support nut 16. In assembly, nut 16 is threaded onto threaded portion 20 of rod 12 such that a section of threaded portion 20 extends below nut 16. Attachment of saucer 18 is then accomplished by engaging threaded portion 50 directly onto threaded portion 20 of rod 12 that extends below nut 16. The second alternate embodiment differs from other embodiments in that saucer 18 is attached directly to rod 12, instead of being attached to support nut 16 as in the other embodiments.

Figure 10:
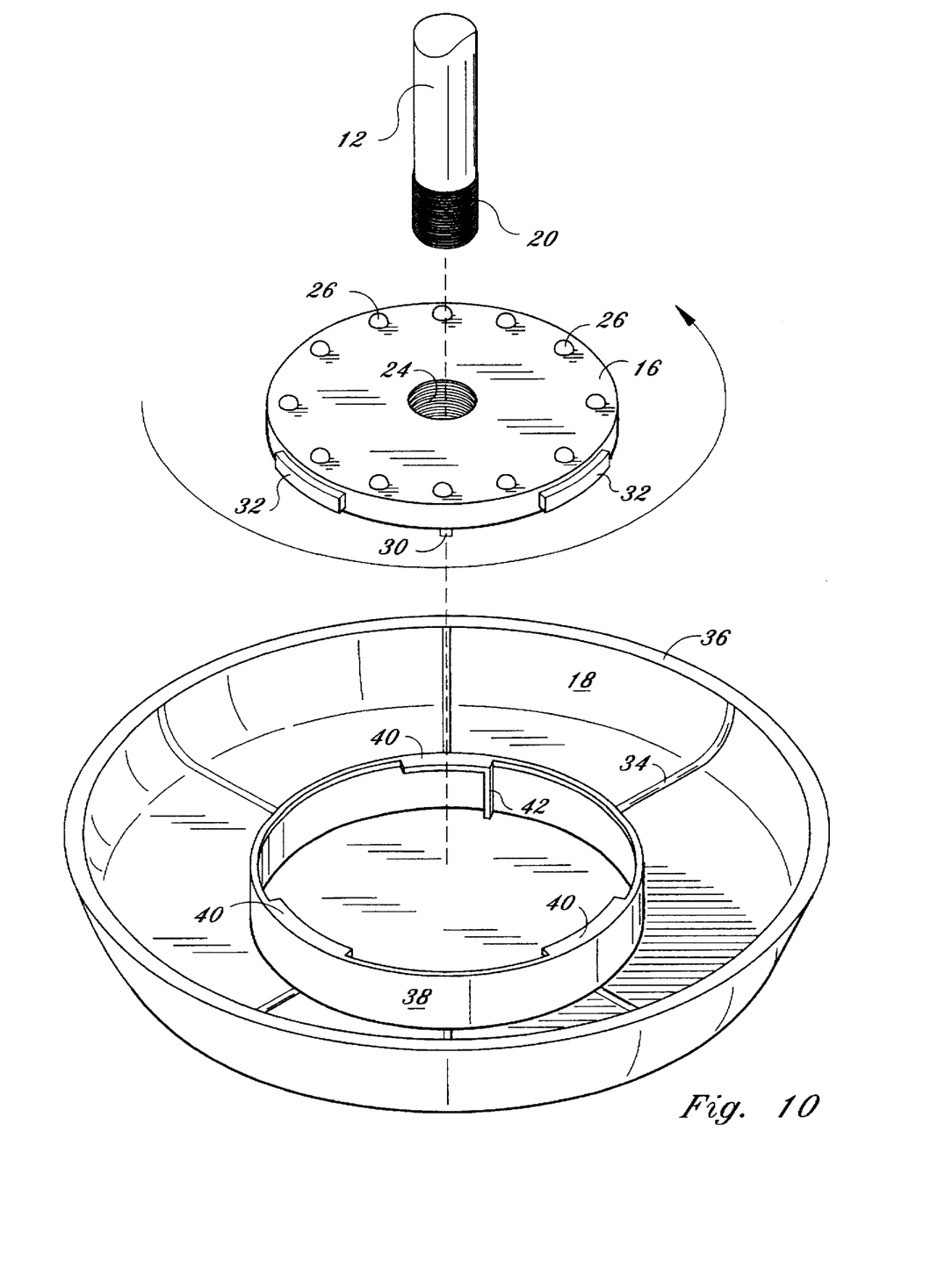
FIG. 10 is a partial exploded perspective view of the preferred embodiment of the present invention.

Referring now to FIG. 10, the primary embodiment of the present invention is shown. This embodiment is the same as the embodiment shown in FIGS. 1–6, with support nut 16 having 3 support shelves 32, and with drip saucer 18 having 3 shelve portions 40 and 3 stop portions 42. Shelve portions 40, and support shelves 32 can be any suitable size.

The embodiments herein described are for example only and are not meant to be the only embodiments contemplated by this invention. There are additional manner that water barrier or saucer 18 can be attached to support nut 16 that are contemplated herein, such as by sliding attachment or by the use of expanding fingers with protruding tabs or prongs that insert into a shaped hollow aperture (not shown). These are considered merely additional fasteners being used to accomplish the same objective. To detail every possible manner of attachment is considered repetitive and unnecessary.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A plant pot hanging device comprising:

a rod having a first end and a second end, at least a portion of said rod being threaded at said first end; said rod including means for hanging at said second end;

an essentially planar support surface having a perimeter and a centrally located threaded aperture, said threaded aperture being removably threadably attached to said first end of said rod, said planar support surface having a plurality of raised tabular support members spaced around said perimeter, said raised tabular support members being essentially parallel to said planar support surface;

a moisture barrier having an essentially planar base and a retaining wall extending generally upwardly from a periphery of said base, said moisture barrier having a centrally located essentially cylindrical raised wall member, said raised wall member having a plurality of raised tabular portions spaced apart on an inside surface of said wall member, said raised tabular portions being essentially parallel to said planar base, each of said raised tabular portions having a raised tabular stop portion located at an end of each of said raised tabular portions, said raised tabular stop portions being essentially perpendicular to said planar base;

said inside surface of said cylindrical raised wall member being sized to removably fit over said perimeter of said essentially planar support surface, and wherein said raised tabular support members of said essentially planar support surface removably and rotatably engage said raised tabular portions of said inside surface of said centrally located essentially cylindrical raised wall member of said moisture barrier, and wherein said raised tabular support members are supportively engaged under said raised tabular portions and in contact with said raised tabular stop portions.

2. The device as claimed in claim 1 wherein said essentially planar support surface includes a plurality of spaced raised hemispherical portions extending upwardly of said essentially planar support surface to support a plant pot.

3. The device as claimed in claim 1 wherein said essentially planar support surface includes at least one rigid support member extending essentially downwardly of said essentially planar support surface.

4. The device as claimed in claim 1 wherein said moisture barrier includes at least one rigid support member connected to said centrally located essentially cylindrical raised wall member and connected to said upwardly extending retaining wall, said rigid support member extending radially between said centrally located essentially cylindrical raised wall member and said upwardly extending retaining wall.

* * * * *